United States Patent [19]

Grady et al.

[11] Patent Number: 4,549,209

[45] Date of Patent: Oct. 22, 1985

[54] X-RAY IMAGE CONVERTER SYSTEM

[75] Inventors: John K. Grady, 111 Flough Rd., Harvard, Mass. 01460; Richard E. Rice, Arlington, both of Mass.

[73] Assignee: John K. Grady, Littleton, Mass.

[21] Appl. No.: 511,226

[22] Filed: Jul. 6, 1983

[51] Int. Cl.[4] .................. H04N 7/18; G03B 41/16; H01J 40/14

[52] U.S. Cl. .................. 358/111; 250/578; 358/174; 378/99

[58] Field of Search .................. 358/111, 174; 378/99, 378/100; 250/578

[56] References Cited

U.S. PATENT DOCUMENTS

| 3,518,371 | 6/1970 | Brookes | 358/174 |
|---|---|---|---|
| 3,892,967 | 7/1975 | Grady | 250/578 |
| 4,355,331 | 10/1982 | Georges | 378/99 |
| 4,426,721 | 1/1984 | Wang | 378/99 |
| 4,442,538 | 4/1984 | Haendle | 378/99 |
| 4,504,859 | 3/1985 | Grady | 358/111 |

Primary Examiner—Howard W. Britton
Attorney, Agent, or Firm—James H. Grover

[57] ABSTRACT

An X-ray system includes an X-ray receptor producing on its area a light image with a finite range of intensities. Two or more video tubes scan the same area of the image to generate corresponding electrical output signals, each tube having a bias electrode controlled by a variable voltage source so that one tube generates output signals whose amplitude corresponds to one portion of the range of light intensities at the image area and the output signals of the other tube correspond to a different range portion of the image area light intensities.

21 Claims, 4 Drawing Figures

X-RAY IMAGE CONVERTER SYSTEM

BACKGROUND OF THE INVENTION

Most modern X-ray hospital equipment not only records images on radiographic plates but also can produce a secondary light image on a scintillation screen which may be viewed directly, photographed with a still or moving picture camera or, as is relevant to the present invention, the secondary light image may be viewed with an electro-optical scanner device which converts the secondary image into corresponding electrical signals for display on a cathode ray tube, for example. The term electro-optical device includes inter alia mechanical photoelectric facsimile scanners, television camera tubes of all types, image intensifiers and similar devices, which may have a bias or control electrode by which the gain of the device and its output signal amplitude may be varied, as well as the lenses, mirrors and similar optics associated with the device, which can also be used to vary the light intensity and thus the overall gain.

Image tubes or flying spot scanners rely on the photoelectric effect, whereas a scintillation screen produces its secondary light image by 1 minescence. Consequently the dynamic range of the scanners and screen differ considerably. Dynamic range is the ratio of lhe brightest to the least bright light point of an image source such as the scintillation screen, or the ratio of brightest to least bright light intensity to which an electro-optical scanner can respond. The dynamic range of the screen will be influenced by the type of X-ray procedure, the X-ray tube voltage, the dimensions and proportions of bone, tissue and air of the subject. The light from a scintillation screen, taking into account the loss in the lens system projecting the image on the scanner, can vary throughout the image with a dynamic range of 1000. A typical television camera tube for such low light levels has a linear response over a dynamic range of only 100 to 150. Thus a typical camera tube can respond linearly to only a fraction, e.g., one tenth, of the dynamic light range of an available scintillation screen. Obviously detail, resolution and contrast are lost in converting the scintillation image to electrical signals.

Additionally the optical inefficiency of the lens system projecting the scintillation image on the scanner reduces light received by the tube not only generally but particularly by operation of the cosine law which reduces light from the corners of the scintillation screen image most remote from its center. The particular light reduction distorts and reduces contrast in the portions of the electrical signal and display corresponding to the corners of the scintillation image.

Electro-optical apparatus which reproduces substantially the full dynamic range of light intensity values throughout an image area is disclosed in copending application Ser. No. 457,678 entitled MULTIPLE X-RAY IMAGE SCANNERS, and filed Jan. 13, 1983, now U.S. Pat. No. 4,504,859. Therein is disclosed X-ray apparatus with a scintillation screen showing a light image in an area viewed by two or more video camera tubes. The tubes receive a projection of the light image in two different ranges of light intensities and generate electrical signals corresponding to the light intensities. The signals are combined to reconstruct the image.

It is the object of the present invention to provide an improved way to match the sensitivities of the camera tubes to the different ranges of the light image.

SUMMARY OF THE INVENTION

According to the invention an image converter system comprises two or more electro-optical devices viewing the same image area and respectively responsive to light received from the area to generate corresponding electrical output signals; and each device including a bias electrode controlling the signal gain of the device; characterized by variable bias means connected to the bias electrode of each electro-optical device for adjusting the gain of each device so that one device generates output signals whose amplitude corresponds to one portion of the range of light intensities at the image area, and another device generates output signals whose emplitude corresponds to another range portion of image area light intensities.

According to a related aspect of the invention each electro-optical device includes means to vary the response or sensitivity and hence the output signal of the device independently of image area light intensity so that one device generates output signals whose amplitude corresponds to one portion of the range light intensities at the image area, and another device generates output signals whose amplitude corresponds to another range portion of image area light intensities.

DRAWING

DESCRIPTION

Figure 1:
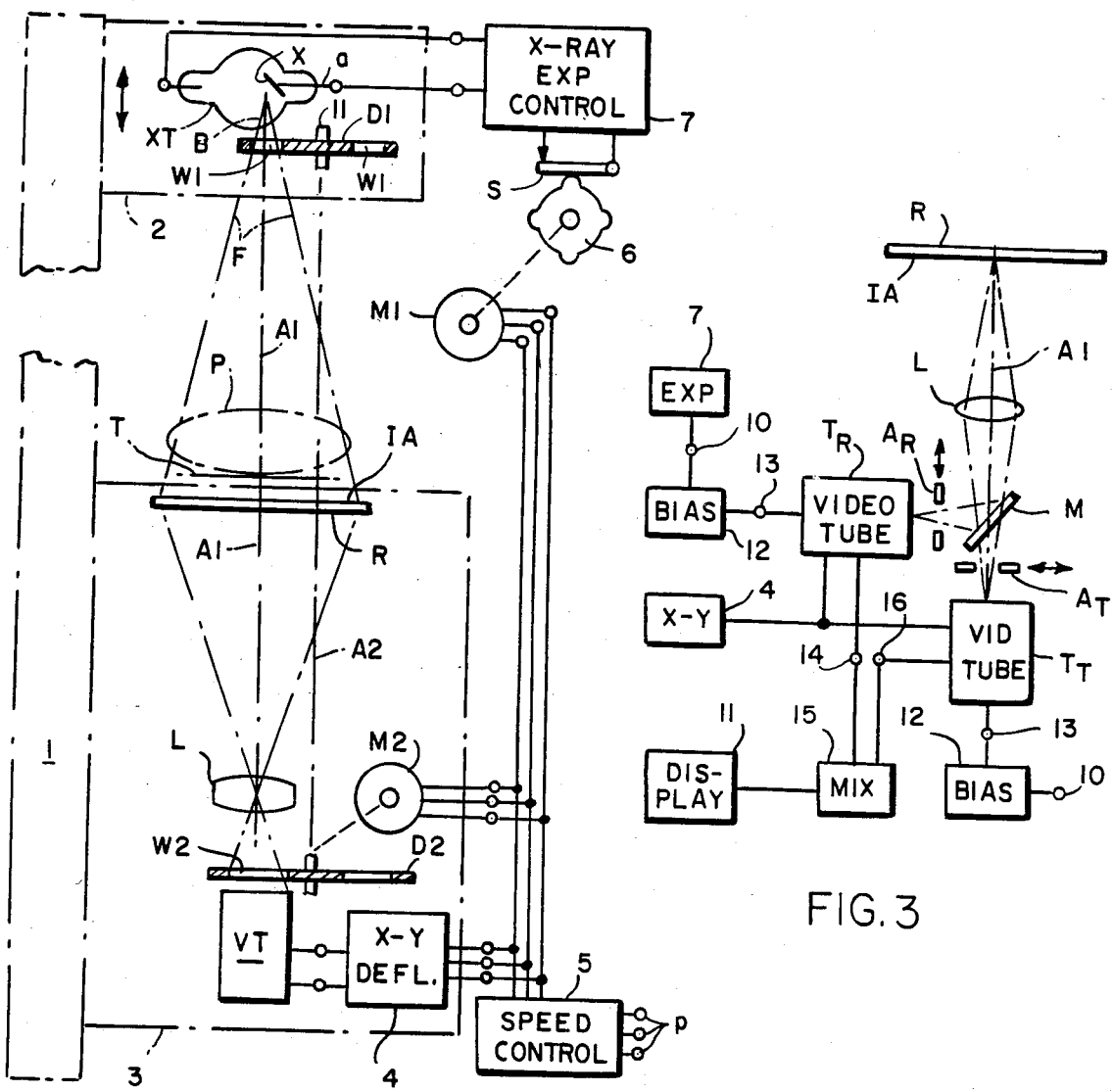
FIG. 1 is an optical diagram of an X-ray system producing a visible image according to the invention, shown in pending application Ser. No. 457,678, showing structural parts schematically.
Figure 2:
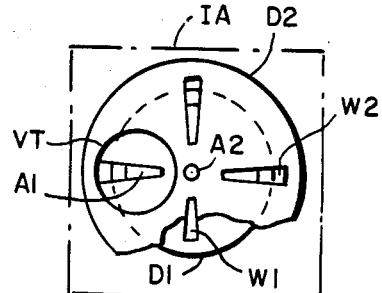
FIG. 2 is a view along the radiation axis of FIG. 1.

In the X-ray system of FIGS. 1 and 2 the X-radiation source is the focal spot X on the anode a of an X-ray tube XT. From the source X a pyramidal or conical beam B is radiated on a radiation axis A1 through the position P of a subject such as a human patient on an X-ray transmissive support table T. Beyond the patient position P is an X-ray receptor R having an X-ray responsive imaging area or plane IA of width W. Typically the receptor is a scintillation screen emitting visible secondary radiation on receipt of X-rays, but other known radiation receptors such as film may be used. The secondary radiation image at the area IA is viewed on the axis A1 by electro-optical utilization means including one of the flying spot scanners previously mentioned such as a video camera tube VT, which converts the secondary image into a frame of electrical video signals corresponding to the subject under examination, and a lens system L which projects the secondary image onto the light responsive surface at the receiving end of the tube VT. The secondary image may also be projected by fibre optics to a photodiode array.

The X-ray tube XT is mounted in a first carriage 2 capable of reciprocal movement on a main frame 1 toward and away from the patient position P. The receptor R, and electro-optical system, lens L and video tube VT, are mounted in a second carriage 3 similarly supported reciprocally on the main frame 1. The patient table T is usually supported independently of the main frame 1 and carriages 2, 3, as shown, for example, in U.S. Pat. No. 3,892,967.

The X-ray beam B is partially intercepted by an X-ray opaque mask comprising a first rotating disk D1 typically having four X-ray transmissive slits or windows W1. As shown in FIG. 2 the windows W1 are sectoral and will transmit a fan-shaped scanning X-ray beam F while the disk D1 masks the remainder of the conical beam B from the receptor R. The windows might, however, be parallel sided rectangular slits in a belt moving linearly or reciprocating through the X-ray beam B. Hereinafter the term "window width" refers to the average width of a sectoral window or the constant width of a rectangular window. A similar but larger rotating disk D2 with four light transmissive windows W2 is located between the lens L and video tube VT before the image plane of lens L. The two disks D1, D2 are rotated on a common axis A2 by synchronous motors M1, M2 respectively. As shown in FIG. 2 the windows W1, W2 of the disks are optically superimposed so that, as the first disk mask D1 is synchronously driven by connection through a speed control 5 to clock regulated alternating current power terminals p, the second disk windows W2 scan the secondary image area IA substantially simultaneously with the scanning of the same area by the first disk windows W1. The X-Y deflection circuit 4 for the video tube scanner is also connected to the synchro control terminals p so that its scan is coordinated with the mask means. With a scintillation screen of very brief image persistence the scan by the video tube is substantially simultaneous with scanning by the masks. But the receptor may include secondary image storage.

The X-ray tube XT is energized by an electronic X-ray exposure control 7 linked through the motor M1 to the power terminals p. For purposes of illustration a mechanical analog of the electronic control is shown. The analog comprises a rotary cam 6 closing a switch S in synchronism with the disk D1 such that the X-ray exposure control 7, in response to closure of the switch S energizes the X-ray tube XT substantially only during the times when X-ray mask windows W1 are transmissive of X-rays to the image area IA of the receptor and not when the transmitted fan beam is beyond the image area, thus reducing power requirements and scattered X-radiation, and increasing the instantaneous power capacity of the tube.

Figure 3:
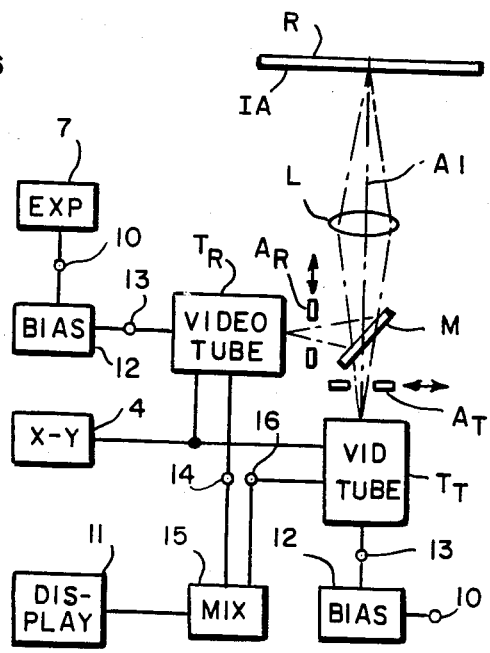
FIG. 3 is an optical diagram of the stages in an image conversion system according to the present invention.
Figure 4:
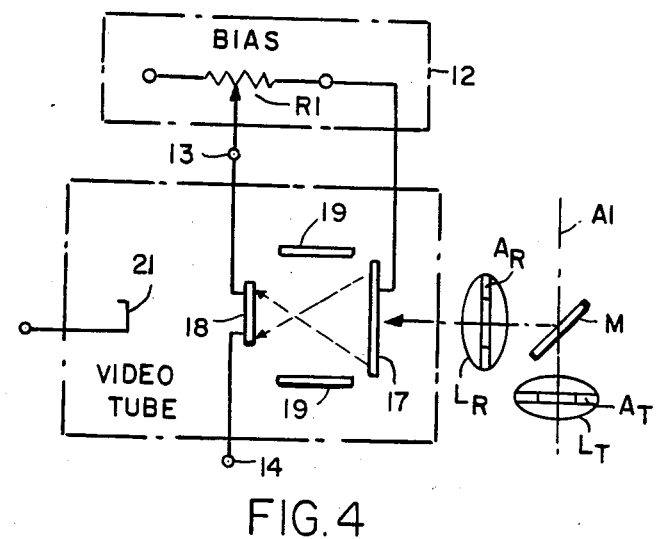
FIG. 4 shows schematically stages in the diagram of FIG. 3.

In the apparatus of FIG. 3 a secondary image is produced by X-rays on the image area of a radiation receptor R as previously described. The image at the area IA is projected by a lens system represented by the simple lens L via a semireflector M onto the light responsive areas of two video camera tubes $T_R$ and $T_T$. That is, both camera tubes view substantially the same area of receptor R. The semireflector M, for example a pellicle mirror, transmits a fraction of light from the secondary image to the first camera tube $T_T$, and reflects the remaining fraction to the second tube $T_R$. A pellicle mirror is a very thin transparent membrane which is supported by a flat metal frame. The ratio of reflectance to transmittance is determined by vacuum evaporation coating with a metal such as silver or aluminum. The proportion of transmitted and reflected light can be varied by adjusting variable apertures $A_T$ and $A_R$ between the semireflector M and tubes $V_T$ and $V_R$, or by selecting mirrors with different amounts of reflection so that the light intensities falling on the video tubes $T_R$ and $T_T$ correspond to different, although preferably overlapping, ranges of light intensities of the image area viewed. Alternatively, as shown in FIG. 4, the lens L may be omitted, and instead two lenses $L_T$ and $L_R$ used, one each between the mirror M and the video tubes $T_R$ and $T_T$. This is advantageous when lenses of short focal length are used to minimize the total length of the optical path between the receptor R and its image at the faces of the video tubes. In this case, the distance between the lens and the faces of the video tube may be too small to accommodate the beam-splitter M. Another advantage of the use of two lenses is the ability to vary the relative illuminance of the two video tubes by the adjustments of variable apertures $A_T$ and $A_R$ incorporated in the two lenses. In some instances this may be preferable to varying the reflectivity of the semireflector M. The scanning by both video tubes is synchronized or otherwise coordinated by a common X-Y deflection generator 4 connected to both tubes. The electrical signals generated by both tubes are fed through connections to a computer 15 which includes a mixer for combining the respective signals to reconstruct electrically the original image area and transmit the resulting mixed signal through a coupling to a display 11 of the reproduced image.

As previously mentioned, the light intensities at the image area IA may extend over a dynamic range of 1000, whereas the range of the video tubes $T_R$, $T_T$ may be only 100. For example, if the scintillation screen (IA of FIG. 3) is of the well-known $Gd_2O_2S$ type, and if a scintillation light image having a dynamic range of 1000 is focused by a lens onto the face of a single low light level silicon intensifier target tube (SIT), such as the RCA 4804/H, the tube face illuminance could typically be in the range from a lower limit of $1 \times 10^{-5}$ to an upper limit of $1 \times 10^{-2}$ lumens per square foot, which is approximately ten times greater than the linear response range of the tube. But, for example, selecting a semireflector M which transmits 90% of incident image light to the first video tube $T_T$ and reflects 10% to the second tube $T_R$, the first video tube will then receive light in a dynamic range from $9 \times 10^{-6}$ to $9 \times 10^{-3}$, the 1000 dynamic range of the scintillation image. In this range the first tube will respond with fidelity only to the intensities from $9 \times 10^{-4}$ to $9 \times 10^{-6}$, the lower hundredth of the image dynamic range. However, the second video tube $T_T$ will receive light corresponding to the full dynamic range of the image, but reduced to 10% of the intensity by the low reflectance of the semireflector M. As a result of the ten fold reduction of image light intensity the maximum intensity of the reflected image is within the range of $T_T$. Thus the two tubes together respond substantially to the full 1000 dynamic range of the image area, all within the capabilities of their individual dynamic ranges of 100. Assuming a 100% transmission factor for the semireflector M, expressed concisely the image area dynamic ranges from $10^{-5}$ to $10^{-2}$ lumens per square foot is covered by the dynamic range of $0.9 \times 10^{-5}$ to $0.9 \times 10^{-3}$ of video tube and the dynamic range of the second tube, also $0.9 \times 10^{-5}$ to $0.9 \times 10^{-3}$. The brighter portion of the image area is converted to electrical signals with substantial fidelity by the first tube, and the less bright portion by the second tube, there being an overlap of the effective dynamic ranges of one order between $0.9 \times 10^{-4}$ and $0.9 \times 10^{-3}$ lumens per square foot.

Wherever a plurality of tubes are used with semireflectors the proportion of light intensity transmission to reflection can be selected to meet the respective dynamic tube ranges needed to cover the image range. The proportion of light intensities received by respective tubes may be varied by selecting a mirror M with a desired degree of silvering or by use of optical lens stops of different or adjustable apertures.

While the respective ranges of reflected and transmitted light can be varied by interchanging mirrors with different degrees of silvering, a supply of such different mirrors would be required as well as careful optical alignment with each interchange. With many X-ray systems no problem arises, but in some systems the dynamic range of a given screen may change because of the X-ray procedure, e.g. fluoroscopy as compared to radiography. In these circumstances adjustment of the dynamic response range of each video tube so as to cover and overlap in the altered range of the image must be done quicker than mirrors could be interchanged.

According to the present invention the respective dynamic ranges of the video tubes or like electro-optical devices viewing the image area are selected by varying the voltage applied to the control or bias electrode of the device. As shown in FIGS. 3 and 4 bias means 12 comprises a potentiometer R1 or equivalent variable voltage source connected through a terminal 13 to video tubes $T_R$ and $T_T$. The bias means may be controlled by the program of the X-ray exposure control 7 of FIG. 1 by connection thereto through a terminal 10.

In FIG. 4 bias control of the silicon intensifier target tube is shown. Such a video tube comprises a photocathode receiving light from the pellicle mirror M and emitting photoelectrons (dashed ines) which are focussed by electrodes 19 on a target 18. The target is scanned by an electron gun 21 to produce a video signal at its output 14 to the computer mixer 15. A control or bias voltage derived from the potentiometer R1 or like variable potential source of the bias means applied across the photocathode 17 and target 18 varies the gain of the video tube in response to image area light $T_T$ (or $T_R$) so as to adjust the amplitude of its video output signal at terminal 14 to correspond with a selected dynamic range of light intensities which covers a portion of the range of the image area projected by the mirror M. By adjusting the bias of both tubes the ratio of their output signal amplitudes is adjusted and hence their coverage of the image area dynamic range despite changes in that range and overlapping portions of that range.

Each bias means 12 has a bias range effective to adjust the response of and hence the output signal of its respective video tube $T_T$ or $T_R$ to correspond with one limit, either the upper or the lower limit, of the range of image illuminance viewed. Preferably the limit of response of each video tube, and of each electro-optical device as a whole, is proportional to the product of one extreme of the light intensity at the image area and the reflectivity of the semireflector, it being understood that there is a minor correction factor attributable to the efficiency of the reflector. With a second video tube the limit of response is proportional to produce the opposite extreme of image area light intensity and unity minus the reflectivity of the semireflector. To insure overlap by the response of the tubes within the dynamic range of the image area it is highly desirable that the system satisfy the expression:

$$T_{TH}/n \; x(1-r) - T_{RL}/y \; r > 0;$$

wherein $T_{TH}$ is the highest transmitted light intensity to which said one tube is responsive, n is the transmission efficiency of the semireflector, r is the reflectivity of the semireflector, $T_{RL}$ is the lowest reflected light intensity to which the second tube is sensitive and x is the optical efficiency of the lens located between the semireflector and video tube $T_T$, y is the optical efficiency of the lens $L_R$ located between the semireflector and video tube $T_R$. The optical efficiencies, x and y are defined as the fraction of the total light emitted by the receptor R, that the respective lenses $L_T$ and $L_R$ would collect and image on the faces of the respective video tubes $T_T$ and $T_R$, if each lens were focussed on the receptor without the intervening semireflector M. When the optional single lens L is used, and lenses $L_T$ and $L_R$ are omitted, then x and y each have the value 1.

The above preferred limitatiors apply to systems wherein variation of the response of each electro-optical device is accomplished by either electrical, optical or electronic means.

However many video tubes view the image area, all their signals are continuously processed by the computer mixer 15 which includes means for gating one signal at a time to the display 11 as the tubes scan the image spot by spot. In the apparatus of FIGS. 3 and 4 the signal from a tube of one dynamic range is selected for gating when the instantaneously scanned spot has an intensity value greater or less than a crossover intensity value in the overlap or limit of the adjacent dynamic range of another tube. When the intensity of successively scanned spots passes through an overlap range about the crossover value to a value in the range of another tube, the signal of that other tube is gated to the display. Thus a continuous signal alternatively derived from two or more tubes is displayed.

It should be understood that the present disclosure is for the purpose of illustration only and that this invention includes all modifications and equivalents which fall within the scope of the appended claims.

For example the response of individual electro-optical means with respect to overlapping portions and the extremes of the image light intensity range may be varied by optical means such as the variable apertures $A_T$ and $A_R$ as well as by the electrical or electronic bias means.

We claim:

1. An image converter system viewing an image area having a finite range of light intensities comprising:

electro-optical means viewing the image area including optical means simultaneously separating the image into at least two further images, the electro-optical means further incluidng at least two electro-optical devices viewing the same image area and respectively responsive to light received from the area simultaneously to generate corresponding electrical output signals; and each device including a bias electrode controlling the signal gain of the device, characterized by variable bias means connected to the bias electrode of each electro-optical device for adjusting the gain of each device so that one device generates output signals whose amplitude corresponds to one portion of the range light intensities at the image area, and another device generates output signals whose amplitude corresponds to another range portion of image area light intensities.

2. A system according to claim 1 wherein the bias means is effective to adjust the ratio of the output signal amplitudes of the devices in response to the respective ranges of image area light intensities.

3. A system according to claim 1 wherein the optical means has the capacity to distribute a different proportion of light to respective devices so that the devices respond to different ranges of image area light intensities.

4. A system according to claim 3 wherein the bias means is effective to adjust the response of respective devices to the different ranges of light.

5. A system according to claim 1 wherein the signal outputs of two electro-optical devices correspond to overlapping portions of the range of image area light intensities.

6. A system according to claim 5 wherein the bias means is effective to adjust the amount of overlap.

7. A system according to claim 5 wherein the bias mean for one device is effective to adjust its output signal to correspond to one limit of the range of image area light intensities.

8. A system according to claim 7 wherein the range of light intensities transmitted to the second tube is in the upper portion of the response range of the second tube.

9. A system according to claim 7 wherein said one device is a video tube with a photocathode and an electrode whose voltage differential determines the response of the tube to illuminance received from the image area, the response being at least as extreme as the corresponding limit of image area light intensity distributed to the tube.

10. A system according to claim 9 wherein the image light is reflected to said one tube by a semireflector and the limit of response of said one tube is proportional to the product of one extreme of the light intensity at the image area and the reflectivity of the semireflector.

11. A system according to claim 10 wherein a second device is a like video tube receiving light transmitted through the semireflector, and the limit of response of the second tube is proportional to the product of the opposite extreme of the light intensity at the image area and unity minus the reflectivity of the semireflector.

12. A system according to claim 11 including lens means collecting image light on the electro-optical devices and characterized by the expression:

$$T_{TH}/n \; x(1-r) - T_{RL}/y \; r > 0;$$

wherein $T_{TH}$ is the highest transmitted light intensity to which said one tube is responsive, n is the transmission efficiency of the semireflector, r is the reflectivity of the semireflector, $T_{RL}$ is the lowest reflected light intensity to which the second tube is sensitive, and x and y are the optical efficiencies of the lens means.

13. An image converter system viewing an image area having a finite range of light intensities comprising:
two or more electro-optical devices viewing the same image area and respectively responsive to light received from the area to generate corresponding electrical output signals; and
each device including means for varying the amplitude of output signals of the device independently of the response of the device to light so that one device generates output signals whose amplitude corresponds to one portion of the range light intensities at the image area, and another device generates output signals whose amplitude corresponds to another range portion of image area light intensities.

14. A system according to claim 13 wherein the varying means for one device is effective to adjust its output signal to correspond to one limit of the range of image area light intensities.

15. A system according to claim 13 wherein the system includes a semireflector reflecting light to one device and the response of said one device is proportional to the product of one extreme of the light intensity at the image area and the reflectivity of the semireflector.

16. A system according to claim 15 wherein a second device receives light transmitted through the semireflector and the light response of said second device is proportional to the product of the opposite extreme of the light intensity at the image area and unity minus the reflectivity of the semireflector.

17. A system according to claim 16 including lens means collecting image light on the electro-optical devices and characterized by the expression:

$$T_{TH}/n \; x(1-r) - T_{RL}/y \; r > 0;$$

wherein $T_{TH}$ is the highest transmitted light intensity to which said one device is responsive, n is the transmission efficiency of the semireflector, r is the reflectivity of the semireflector, $T_{RL}$ is the lowest reflected light intensity to which the second device is sensitive, and x and y are the optical efficiencies of the lens means.

18. The method of producing electrical signals from X-radiation transmitted through a subject which comprises:
receiving the transmitted radiation on an X-ray responsive device generating a secondary light image having a finite range of light intensities between two limits;
distributing light from the image to at least two light responsive devices generating at least two signals corresponding to the image; and
adjusting the light responsive devices so that one device generates output signals whose amplitude corresponds to one portion of the range light intensities at the image area, and another device generates output signals whose amplitude corresponds to another range portion of image area light intensities.

19. The method according to claim 18 wherein one device is adjusted so that its output signals correspond to one limit of the range of image area light intensities.

20. The method according to claim 18 wherein light from the image area is distributed with a semireflector by reflection and transmission to respective devices and another device is adjusted so that its light response is proportional to the product of the opposite extreme of the light intensity at the image area and unity minus the reflectivity of the semireflector.

21. The method according to claim 20 wherein light from the image is collected on respective devices by lens means and the adjustment is made according to the expressions:

$$T_{TH}/n \; x(1-r) - T_{RL}/y \; r > 0;$$

wherein $T_{TH}$ is the highest transmitted light intensity to which said one device is responsive, n is the transmission efficiency of the semireflector, r is the reflectivity of the semireflector, $T_{RL}$ is the lowest reflected light intensity to which the second device is sensitive, and x and y are the optical efficiencies of the lens means.

* * * * *